US007822061B2

(12) United States Patent
Dropps et al.

(10) Patent No.: US 7,822,061 B2
(45) Date of Patent: Oct. 26, 2010

(54) METHOD AND SYSTEM FOR POWER CONTROL OF FIBRE CHANNEL SWITCHES

(75) Inventors: Frank R. Dropps, Maple Grove, MN (US); Charles M. Comp, Eden Prairie, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 106 days.

(21) Appl. No.: 12/267,188

(22) Filed: Nov. 7, 2008

(65) Prior Publication Data

US 2009/0123150 A1    May 14, 2009

Related U.S. Application Data

(63) Continuation of application No. 10/894,689, filed on Jul. 20, 2004, now Pat. No. 7,477,655.

(60) Provisional application No. 60/503,812, filed on Sep. 19, 2003, provisional application No. 60/537,933, filed on Jan. 21, 2004, provisional application No. 60/488,757, filed on Jul. 21, 2003, provisional application No. 60/532,965, filed on Dec. 29, 2003, provisional application No. 60/504,038, filed on Sep. 19, 2003, provisional application No. 60/495,212, filed on Aug. 14, 2003, provisional application No. 60/495,165, filed on Aug. 14, 2003, provisional application No. 60/503,809, filed on Sep. 19, 2003, provisional application No. 60/505,381, filed on Sep. 23, 2003, provisional application No. 60/505,195, filed on Sep. 23, 2003, provisional application No. 60/557,613, filed on Mar. 30, 2004, provisional application No. 60/505,075, filed on Sep. 23, 2003, provisional application No. 60/504,950, filed on Sep. 19, 2003, provisional application No. 60/532,967, filed on Dec. 29, 2003, provisional application No. 60/532,966, filed on Dec. 29, 2003, provisional application No. 60/550,250, filed on Mar. 4, 2004, provisional application No. 60/569,436, filed on May 7, 2004, provisional application No. 60/572,197, filed on May 18, 2004, provisional application No. 60/532,963, filed on Dec. 29, 2003.

(51) Int. Cl.
*H04L 12/66* (2006.01)
(52) U.S. Cl. .................................... 370/463
(58) Field of Classification Search ............... 370/394, 370/463; 710/306; 713/320, 321; 327/142
See application file for complete search history.

(56) References Cited

U.S. PATENT DOCUMENTS 4,964,119 A    10/1990 Endo et al.

(Continued)

OTHER PUBLICATIONS

"Office Action from China State Intellectual Property Office dated Dec. 11, 2009 for Chinese Application No. 200580032948.4".

(Continued)

*Primary Examiner*—Kwang B Yao
*Assistant Examiner*—Andrew Lai
(74) *Attorney, Agent, or Firm*—Klein, O'Neill & Singh, LLP

(57) ABSTRACT

A method and system for controlling power consumption in a fiber channel switch element having a plurality of ports and plural links to communicate over a network is provided. The switch element includes, a power control module that is used to provide power to only active ports after firmware of fiber channel switch element determines the active ports. The method includes, determining active ports of the fiber channel switch element, after all the ports are shut down in a known state; and providing power to only the active ports. All ports are powered up during fiber channel switch element reset and then powered down (except a common port) so that the ports are shut down in a known state.

11 Claims, 11 Drawing Sheets

U.S. PATENT DOCUMENTS

| | | | |
|---|---|---|---|
| 5,258,751 A | | 11/1993 | DeLuca et al. |
| 5,260,935 A | * | 11/1993 | Turner ........................ 370/394 |
| 5,280,483 A | | 1/1994 | Kamoi et al. |
| 5,291,481 A | | 3/1994 | Doshi et al. |
| 5,425,022 A | | 6/1995 | Clark et al. |
| 5,568,167 A | | 10/1996 | Galbi et al. |
| 5,579,443 A | | 11/1996 | Tatematsu et al. |
| 5,594,672 A | * | 1/1997 | Hicks ........................ 713/321 |
| 5,638,518 A | | 6/1997 | Malladi |
| 5,687,387 A | * | 11/1997 | Endejan et al. ................ 710/2 |
| 5,751,710 A | | 5/1998 | Crowther et al. |
| 5,757,771 A | | 5/1998 | Li et al. |
| 5,835,748 A | | 11/1998 | Orenstein et al. |
| 5,892,604 A | | 4/1999 | Yamanaka et al. |
| 5,925,119 A | | 7/1999 | Maroney |
| 5,936,442 A | * | 8/1999 | Liu et al. ..................... 327/142 |
| 6,009,226 A | | 12/1999 | Tsuji et al. |
| 6,118,791 A | | 9/2000 | Fichou et al. |
| 6,131,123 A | | 10/2000 | Hurst et al. |
| 6,147,976 A | | 11/2000 | Shand et al. |
| 6,148,421 A | | 11/2000 | Hoese et al. |
| 6,230,276 B1 | * | 5/2001 | Hayden ...................... 713/320 |
| 6,278,708 B1 | | 8/2001 | Von Hammerstein et al. |
| 6,307,857 B1 | | 10/2001 | Yokoyama et al. |
| 6,311,204 B1 | | 10/2001 | Mills et al. |
| 6,339,813 B1 | | 1/2002 | Smith et al. |
| 6,397,360 B1 | | 5/2002 | Bruns |
| 6,480,500 B1 | | 11/2002 | Erimli et al. |
| 6,553,036 B1 | | 4/2003 | Miller et al. |
| 6,563,796 B1 | | 5/2003 | Saito |
| 6,625,157 B2 | | 9/2003 | Niu et al. |
| 6,629,161 B2 | | 9/2003 | Matsuki et al. |
| 6,700,877 B1 | | 3/2004 | Lorenz et al. |
| 6,765,871 B1 | | 7/2004 | Knobel et al. |
| 6,779,083 B2 | | 8/2004 | Ito et al. |
| 6,865,155 B1 | | 3/2005 | Wong et al. |
| 6,975,627 B1 | | 12/2005 | Parry et al. |
| 6,983,342 B2 | | 1/2006 | Helenic et al. |
| 7,031,615 B2 | | 4/2006 | Genrile |
| 7,233,570 B2 | | 6/2007 | Gregg |
| 7,239,641 B1 | | 7/2007 | Banks et al. |
| 7,245,627 B2 | | 7/2007 | Goldenberg et al. |
| 7,275,103 B1 | | 9/2007 | Thrasher et al. |
| 7,310,389 B2 | | 12/2007 | Waschura et al. |
| 7,319,669 B1 | | 1/2008 | Kunz et al. |
| 7,334,046 B1 | | 2/2008 | Betker |
| 7,460,534 B1 | | 2/2008 | Ballenger |
| 7,352,701 B1 | | 4/2008 | Kunz |
| 7,352,740 B2 | | 4/2008 | Hammons et al. |
| 7,362,702 B2 | | 4/2008 | Terrell et al. |
| 7,397,788 B2 | | 7/2008 | Mies et al. |
| 7,406,034 B1 | | 7/2008 | Cometto et al. |
| 7,406,092 B2 | | 7/2008 | Dropps et al. |
| 7,424,533 B1 | | 9/2008 | Di Benedetto et al. |
| 7,443,794 B2 | | 10/2008 | George et al. |
| 7,466,700 B2 | | 12/2008 | Dropps et al. |
| 7,471,691 B2 | | 12/2008 | Black et al. |
| 7,492,780 B1 | | 2/2009 | Goolsby |
| 2002/0067726 A1 | | 6/2002 | Ganesh et al. |
| 2002/0118692 A1 | | 8/2002 | Oberman et al. |
| 2002/0124102 A1 | | 9/2002 | Kramer et al. |
| 2003/0002516 A1 | | 1/2003 | Boock et al. |
| 2003/0037159 A1 | | 2/2003 | Zhao et al. |
| 2003/0063567 A1 | | 4/2003 | Dehart |
| 2003/0091062 A1 | | 5/2003 | Lay et al. |
| 2003/0093607 A1 | * | 5/2003 | Main et al. .................. 710/306 |
| 2003/0112819 A1 | | 6/2003 | Kofoed et al. |
| 2003/0120791 A1 | | 6/2003 | Weber et al. |
| 2003/0152076 A1 | | 8/2003 | Lee et al. |
| 2003/0179748 A1 | | 9/2003 | George et al. |
| 2003/0191883 A1 | | 10/2003 | April |
| 2003/0200315 A1 | | 10/2003 | Goldenberg et al. |
| 2004/0027989 A1 | | 2/2004 | Martin et al. |
| 2004/0120340 A1 | | 6/2004 | Furey et al. |
| 2004/0125799 A1 | | 7/2004 | Buer |
| 2004/0141518 A1 | | 7/2004 | Milligan et al. |
| 2004/0153566 A1 | | 8/2004 | Lalsangi et al. |
| 2004/0153863 A1 | | 8/2004 | Klotz et al. |
| 2004/0218531 A1 | | 11/2004 | Cherian et al. |
| 2005/0036485 A1 | | 2/2005 | Eilers et al. |
| 2005/0099970 A1 | | 5/2005 | Halliday |
| 2005/0111845 A1 | | 5/2005 | Nelson et al. |
| 2005/0188245 A1 | | 8/2005 | Seto et al. |

OTHER PUBLICATIONS

"Office Action from USPTO dated Jan. 6, 2010 for U.S. Appl. No. 10/956,501".
"Office Action from State Intellectual Property Office dated Dec. 4, 2009 for Chinese Application No. 200580032947.X".
"Notice of Allowance from USPTO dated Jan. 21, 2010 for U.S. Appl. No. 10/894,547".
"Office Action from USTPO dated Jan. 26, 2010 for U.S. Appl. No. 10/956,501".
"Final Office Action from USPTO dated Feb. 12, 2010 for U.S. Appl. No. 10/894,732".
"Office Action from USPTO dated Sep. 23, 2008 for U.S. Appl. No. 12/031,585".
"Project-T11/1619-D/Rev. 0,50", *Information technology Industry Council, Fibre Channel: Framing and Signaling-2*, Dec. 2004, Rev. 0.50, (Dec. 2004),76, 81, 114, 115.
"Notice of Allowance from the USPTO dated Sep. 29, 2008 for U.S. Appl. No. 10/889,267".
"Office Action from USPTO dated Sep. 29, 2008 for U.S. Appl. No. 11/363,365".
"Final Office Action from USPTO dated Oct. 8, 2008 for U.S. Appl. No. 11/057,912".
"Non-Final Office Action from USPTO dated Oct. 10, 2008 for U.S. Appl. No. 10/894,627".
"Notice of Allowance from USPTO dated Oct. 8, 2008 for U.S. Appl. No. 10/889,255".
"Notice of Allowance from USPTO dated Oct. 8, 2008 for U.S. Appl. No. 10/798,527".
"Notice of Allowance from USPTO dated Oct. 15, 2008 for U.S. Appl. No. 10/894,492".
"Final Office Action from USPTO dated Oct. 17, 2008 for U.S. Appl. No. 10/894,595".
"Final Office Action from USPTO dated Nov. 13, 2008 for U.S. Appl. No. 10/894,587".
"Office Action from USPTO dated Nov. 13, 2008 for U.S. Appl. No. 10/894,917".
"Office Action from USPTO dated Nov. 26, 2008 for U.S. Appl. No. 10/956,502".
"Office Action from USPTO dated Nov. 26, 2008 for U.S. Appl. No. 10/894,547".
"Final Office Action from USPTO dated Dec. 24, 2008 for U.S. Appl. No. 10/894,726".
"Office Action from USPTO dated Dec. 23, 2008 for U.S. Appl. No. 10/798,468".
"Notice of Allowance from USPTO dated Dec. 30, 2008 for U.S. Appl. No. 11/037,922".
"Final Office Action from USPTO dated Jan. 21, 2009 for U.S. Appl. No. 10/894,827".
"Office Action from USPTO dated Jan. 17, 2009 for U.S. Appl. No. 10/894,586".
"Notice of Allowance from USPTO dated Feb. 10, 2009 for U.S. Appl. No. 10/894,595".
"Office Action from USPTO dated Feb. 17, 2009 for U.S. Appl. No. 10/894,732".
"Notice of Allowance from USPTO dated Feb. 25, 2009 for U.S. Appl. No. 10/894,827".
"Notice of Allowance from USPTO dated Feb. 27, 2009 for U.S. Appl. No. 10/895,175".

"Notice of Allowance from USPTO dated Mar. 6, 2009 for U.S. Appl. No. 10/956,502".
"Office Action from USPTO dated Mar. 9, 2009 for U.S. Appl. No. 11/057,912".
"Notice of Allowance from USPTO dated Mar. 9, 2009 for U.S. Appl. No. 10/889,635".
"Office Action from USPTO dated Mar. 16, 2009 for U.S. Appl. No. 10/956,501".
"Notice of Allowance from USPTO dated Mar. 20, 2009 for U.S. Appl. No. 10/894,978".
"Notice of Allowance from USPTO dated Mar. 23, 2009 for U.S. Appl. No. 12/198,644".
"Notice of Allowance from USPTO dated Mar. 31, 2009 for U.S. Appl. No. 12/031,585".
"Office Action from USPTO dated Apr. 2, 2009 for U.S. Appl. No. 10/889,256".
"Examination Report from European Patent Office dated Mar. 27, 2009 for European Application No. 05798761.2".
"Notice of Allowance from USPTO dated Apr. 27, 2009 for U.S. Appl. No. 11/363,365".
"Notice of Allowance from USPTO dated May 5, 2009 for U.S. Appl. No. 10/798,468".
"Office Action from USPTO dated May 14, 2009 for U.S. Appl. No. 11/682,199".
"Notice of Allowance from USPTO dated May 18, 2009 for U.S. Appl. No. 10/894,917".
"Notice of Allowance from USPTO dated May 26, 2009 for U.S. Appl. No. 10/894,627".
"Office Action from USPTO dated Jun. 25, 2009 for U.S. Appl. No. 10/894,547".
"Notice of Allowance from USPTO dated Jul. 6, 2009 for U.S. Appl. No. 10/894,587".
"Notice of Allowance from USPTO dated Jul. 9, 2009 for U.S. Appl. No. 10/894,726".
"Office Action from USPTO dated Jul. 23, 2009 for U.S. Appl. No. 10/894,732".
"Office Action from Chinese State Intellectual Property Office dated Jul. 10, 2009 for Chinese Application No. 200580032888.6".
"Office Action dated Jun. 19, 2009 from State Intellectual Property Office for Chinese Application No. 200580032948.4".
"Office Action from USPTO dated Sep. 8, 2009 for U.S. Appl. No. 11/743,852".
"Final Office Action from USPTO dated Sep. 15, 2009 for U.S. Appl. No. 10/956,501".
"Office Action from USPTO dated Sep. 25, 2009 for U.S. Appl. No. 11/682,199".
"Final Office Action from USPTO dated Oct. 26, 2009 for U.S. Appl. No. 10/894,546".
"Notice of Allowance from USPTO dated Nov. 2, 2009 for U.S. Appl. No. 12/189,497".
"Final Office Action from USPTO dated Nov. 10, 2009 for U.S. Appl. No. 11/057,912".
"Office Action from USPTO dated Dec. 2, 2009 for U.S. Appl. No. 12/141,519".
"Final Office Action from USPTO dated Mar. 4, 2010 for U.S. Appl. No. 10/957,465".
"Office Action from USPTO dated Mar. 29, 2010 for U.S. Appl. No. 12/189,502".
"Notice of Allowance from USPTO dated Apr. 7, 2010 for U.S. Appl. No. 11/682,199".
"Office Action from USPTO dated Apr. 23, 2010 for U.S. Appl. No. 12/191,890".
"Communication Under Rule 71(3) EPC indicating allowance of application dated Apr. 9, 2010 from European Patent Office for European Application No. 05798761.2".
"Notification of Grant of Patent from the State Intellectual Property Office of P.R.C. dated Mar. 25, 2010 for Chinese Application No. 200580032948.4".
"Notice of Allowance from USPTO dated May 28, 2010 for U.S. Appl. No. 12/141,519".
"Office Action from State Intellectual Property Office of China dated May 20, 2010 for Chinese Application No. 200580032947.X".
"Office Action from USPTO dated Jun. 10, 2010 for U.S. Appl. No. 12/259,197".
"Notice of Allowance from USPTO dated Jul. 19, 2010 for U.S. Appl. No. 10/894,546".
"Final Office Action from USPTO dated Aug. 16, 2010 for U.S. Appl. No. 10/956,501".
"Notice of Allowance from USPTO dated Aug. 18, 2010 for U.S. Appl. No. 10/957,465".
"Notice of Allowance from USPTO dated Aug. 18, 2010 for U.S. Appl. No. 12/191,890".

* cited by examiner

METHOD AND SYSTEM FOR POWER CONTROL OF FIBRE CHANNEL SWITCHES

CROSS REFERENCE TO RELATED APPLICATIONS

This application is a continuation of a application Ser. No. 10/894,689 filed Jul. 20, 2004, now U.S. Pat. No. 7,477,655, which claims priority under 35 U.S.C. §119(e) (1) to the following provisional patent applications:

Filed on Sep. 19, 2003, Ser. No. 60/503,812, entitled "Method and System for Fibre Channel Switches";

Filed on Jan. 21, 2004, Ser. No. 60/537,933 entitled "Method And System For Routing And Filtering Network Data Packets In Fibre Channel Systems";

Filed on Jul. 21, 2003, Ser. No. 60/488,757, entitled "Method and System for Selecting Virtual Lanes in Fibre Channel Switches";

Filed on Dec. 29, 2003, Ser. No. 60/532,965, entitled "Programmable Pseudo Virtual Lanes for Fibre Channel Systems";

Filed on Sep. 19, 2003, Ser. No. 60/504,038, entitled "Method and System for Reducing Latency and Congestion in Fibre Channel Switches;

Filed on Aug. 14, 2003, Ser. No. 60/495,212, entitled "Method and System for Detecting Congestion and Over Subscription in a Fibre channel Network";

Filed on Aug. 14, 2003, Ser. No. 60/495,165, entitled "LUN Based Hard Zoning in Fibre Channel Switches";

Filed on Sep. 19, 2003, Ser. No. 60/503,809, entitled "Multi Speed Cut Through Operation in Fibre Channel Switches";

Filed on Sep. 23, 2003, Ser. No. 60/505,381, entitled "Method and System for Improving bandwidth and reducing Idles in Fibre Channel Switches";

Filed on Sep. 23, 2003, Ser. No. 60/505,195, entitled "Method and System for Keeping a Fibre Channel Arbitrated Loop Open During Frame Gaps";

Filed on Mar. 30, 2004, Ser. No. 60/557,613, entitled "Method and System for Congestion Control based on Optimum Bandwidth Allocation in a Fibre Channel Switch";

Filed on Sep. 23, 2003, Ser. No. 60/505,075, entitled "Method and System for Programmable Data Dependent Network Routing";

Filed on Sep. 19, 2003, Ser. No. 60/504,950, entitled "Method and System for Power Control of Fibre Channel Switches";

Filed on Dec. 29, 2003, Ser. No. 60/532,967, entitled "Method and System for Buffer to Buffer Credit recovery in Fibre Channel Systems Using Virtual and/or Pseudo Virtual Lane";

Filed on Dec. 29, 2003, Ser. No. 60/532,966, entitled "Method And System For Using Extended Fabric Features With Fibre Channel Switch Elements";

Filed on Mar. 4, 2004, Ser. No. 60/550,250, entitled "Method And System for Programmable Data Dependent Network Routing";

Filed on May 7, 2004, Ser. No. 60/569,436, entitled "Method And System For Congestion Control in A Fibre Channel Switch";

Filed on May 18, 2004, Ser. No. 60/572,197, entitled "Method and System for Configuring Fibre Channel Ports" and Filed on Dec. 29, 2003, Ser. No. 60/532,963 entitled "Method and System for Managing Traffic in Fibre Channel Switches".

The disclosure of the foregoing applications is incorporated herein by reference in their entirety.

BACKGROUND

1. Field of the Invention

The present invention relates to fibre channel systems, and more particularly, to improving power control in fibre channel systems.

2. Background of the Invention

Fibre channel is a set of American National Standard Institute (ANSI) standards, which provide a serial transmission protocol for storage and network protocols such as HIPPI, SCSI, IP, ATM and others. Fibre channel provides an input/output interface to meet the requirements of both channel and network users.

Fibre channel supports three different topologies: point-to-point, arbitrated loop and fibre channel fabric. The point-to-point topology attaches two devices directly. The arbitrated loop topology attaches devices in a loop. The fibre channel fabric topology attaches host systems directly to a fabric, which are then connected to multiple devices. The fibre channel fabric topology allows several media types to be interconnected.

Fibre channel is a closed system that relies on multiple ports to exchange information on attributes and characteristics to determine if the ports can operate together. If the ports can work together, they define the criteria under which they communicate.

In fibre channel, a path is established between two nodes where the path's primary task is to transport data from one point to another at high speed with low latency, performing only simple error detection in hardware.

Fibre channel fabric devices include a node port or "N_Port" that manages fabric connections. The N_port establishes a connection to a fabric element (e.g., a switch) having a fabric port or F_port. Fabric elements include the intelligence to handle routing, error detection, recovery, and similar management functions.

A fibre channel switch is a multi-port device where each port manages a simple point-to-point connection between itself and its attached system. Each port can be attached to a server, peripheral, I/O subsystem, bridge, hub, router, or even another switch. A switch receives messages from one port and automatically routes it to another port. Multiple calls or data transfers happen concurrently through the multi-port fibre channel switch.

Fibre channel switches use memory buffers to hold frames received (at receive buffers) and sent across (via transmit buffers) a network. Associated with these buffers are credits, which are the number of frames that a buffer can hold per fabric port.

Fibre channel switches can have varying number of ports (for example, 8, 16 and/or 20 ports). However, all the ports may not be used at a given time depending upon fabric topology or network needs. Power consumption for these switches can also vary depending upon the number of ports.

Conventional fibre channel systems do not have a uniform power consumption control mechanism that will allow a user to use a single ASIC in different platforms that have different requirements. For example, a conventional 20-port fibre channel switch cannot be used efficiently in a platform that does not need all the twenty ports. Hence, in conventional systems, the non-recurring cost of developing ASICs for different platforms is very high. This is commercially undesirable.

Therefore, there is a need for a method and system that can optimize power consumption so that a single ASIC can be used in different platforms.

SUMMARY OF THE PRESENT INVENTION

In one aspect of the present invention, a method for controlling power consumption in a fibre channel switch element having a plurality of ports and plural links to communicate over a network is provided. The method includes, determining active ports of the fibre channel switch element, after all the ports are shut down in a known state; and providing power to only the active ports. All ports are powered up during fibre channel switch element reset and then powered down (except a common port) so that the ports are shut down in a known state.

In yet another aspect of the present invention, a fibre channel switch element having a plurality of ports and plural links to communicate over a network is provided. The switch element includes, a power control module that is used to provide power to only active ports after firmware of fibre channel switch element determines the active ports.

In yet another aspect of the present invention, a fibre channel system that allows communication over a network is provided. The system includes, a fibre channel switch element having a power control module that is used to provide power to only active ports of the fibre channel switch element after firmware of the fibre channel switch element determines the active ports.

In yet another aspect of the present invention, a fibre channel system that allows communication over a network is provided. The system includes, a fibre channel switch element having a power control module that is used to provide active clocks to active ports of the fibre channel switch element after firmware of the fibre channel switch element determines the active ports.

In one aspect of the present inventions worst-case power requirements are reduced. Also, different size systems can be designed with the same switch element and optimize cooling and power requirements for reduced space and cost.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

Definitions

The following definitions are provided as they are typically (but not exclusively) used in the fibre channel environment, implementing the various adaptive aspects of the present invention:

"ASIC": Application Specific Integrated Circuit

"EOF": End of Frame

"E-Port": A fabric expansion port that attaches to another Interconnect port to create an Inter-Switch Link.

"F_Port": A port to which non-loop N_Ports are attached to a fabric and does not include FL_ports.

"Fibre channel ANSI Standard": The standard (incorporated herein by reference in its entirety) describes the physical interface, transmission and signaling protocol of a high performance serial link for support of other high level protocols associated with IPI, SCSI, IF, ATM and others.

"FC-1": Fibre channel transmission protocol, which includes serial encoding, decoding and error control.

"FC-2": Fibre channel signaling protocol that includes frame structure and byte sequences.

"FC-3": Defines a set of fibre channel services that are common across plural ports of a node.

"FC-4": Provides mapping between lower levels of fibre channel, IPI and SCSI command sets, HIPPI data framing, IP and other upper level protocols.

"Fabric": The structure or organization of a group of switches, target and host devices (NL_Port, N_ports etc.).

"Fabric Topology": This is a topology where a device is directly attached to a fibre channel fabric that uses destination identifiers embedded in frame headers to route frames through a fibre channel fabric to a desired destination.

"FL_Port": A L_Port that is able to perform the function of a F_Port, attached via a link to one or more NL_Ports in an Arbitrated Loop topology.

"Inter-Switch Link": A Link directly connecting the E_port of one switch to the E_port of another switch.

Port: A general reference to N. Sub.--Port or F. Sub.--Port.

"L_Port": A port that contains Arbitrated Loop functions associated with the Arbitrated Loop topology.

"N_Port": A direct fabric attached port.

"NL_Port": A L_Port that can perform the function of a N_Port.

"SOF": Start of Frame

"Switch": A fabric element conforming to the Fibre Channel Switch standards.

Fibre Channel System:

To facilitate an understanding of the preferred embodiment, the general architecture and operation of a fibre channel system will be described. The specific architecture and operation of the preferred embodiment will then be described with reference to the general architecture of the fibre channel system.

Figure 1A:
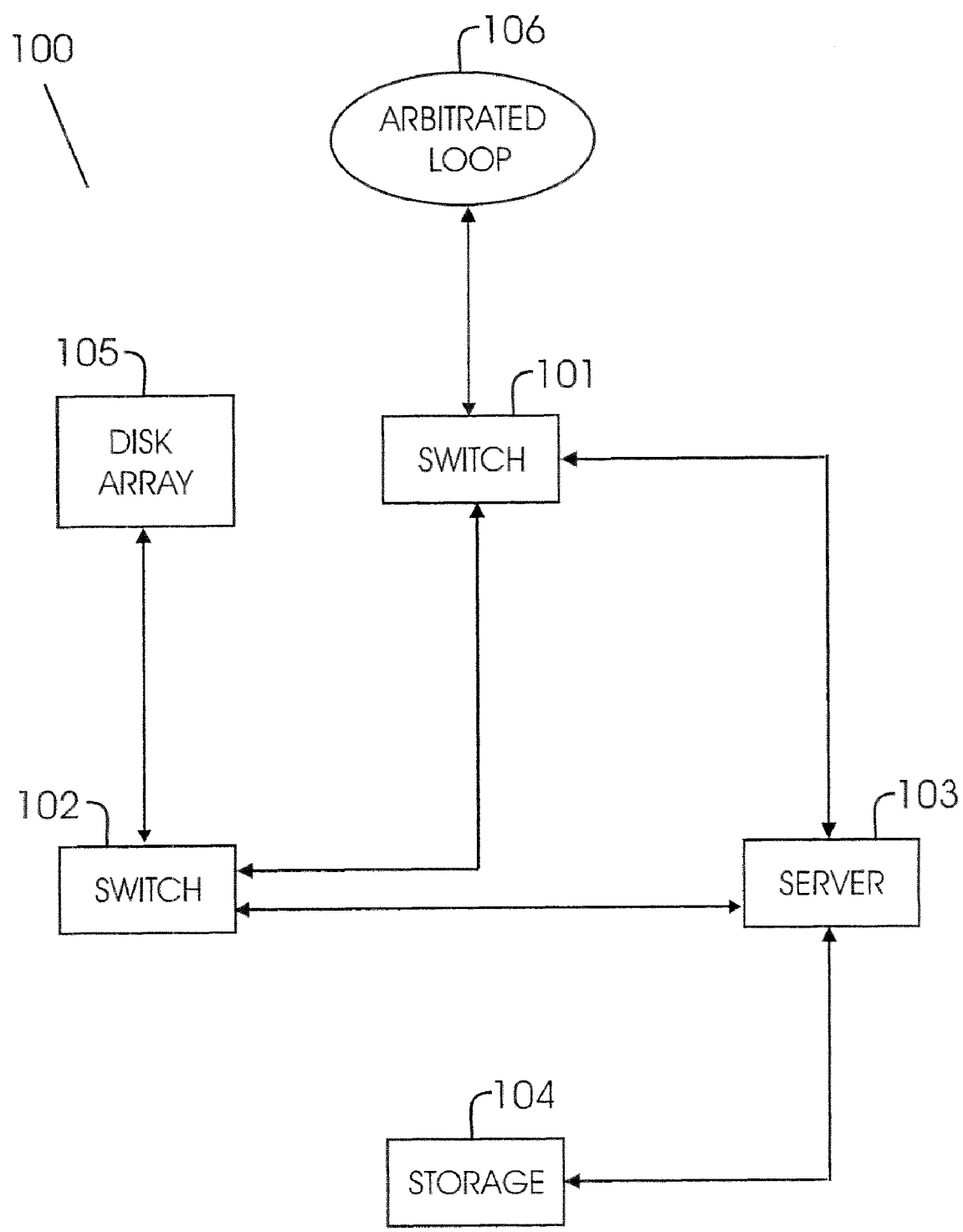
FIG. 1A shows an example of a Fibre Channel network system.

FIG. 1A is a block diagram of a fibre channel system 100 implementing the methods and systems in accordance with the adaptive aspects of the present invention. System 100 includes plural devices that are interconnected. Each device includes one or more ports, classified as node ports (N_Ports), fabric ports (F_Ports), and expansion ports (E_Ports). Node ports may be located in a node device, e.g. server 103, disk array 105 and storage device 104. Fabric ports are located in fabric devices such as switch 101 and 102. Arbitrated loop 106 may be operationally coupled to switch 101 using arbitrated loop ports (FL_Ports).

The devices of FIG. 1A are operationally coupled via "links" or "paths". A path may be established between two N_ports, e.g. between server 103 and storage 104. A packet-switched path may be established using multiple links, e.g. an N-Port in server 103 may establish a path with disk array 105 through switch 102.

Fabric Switch Element

Figure 1B:
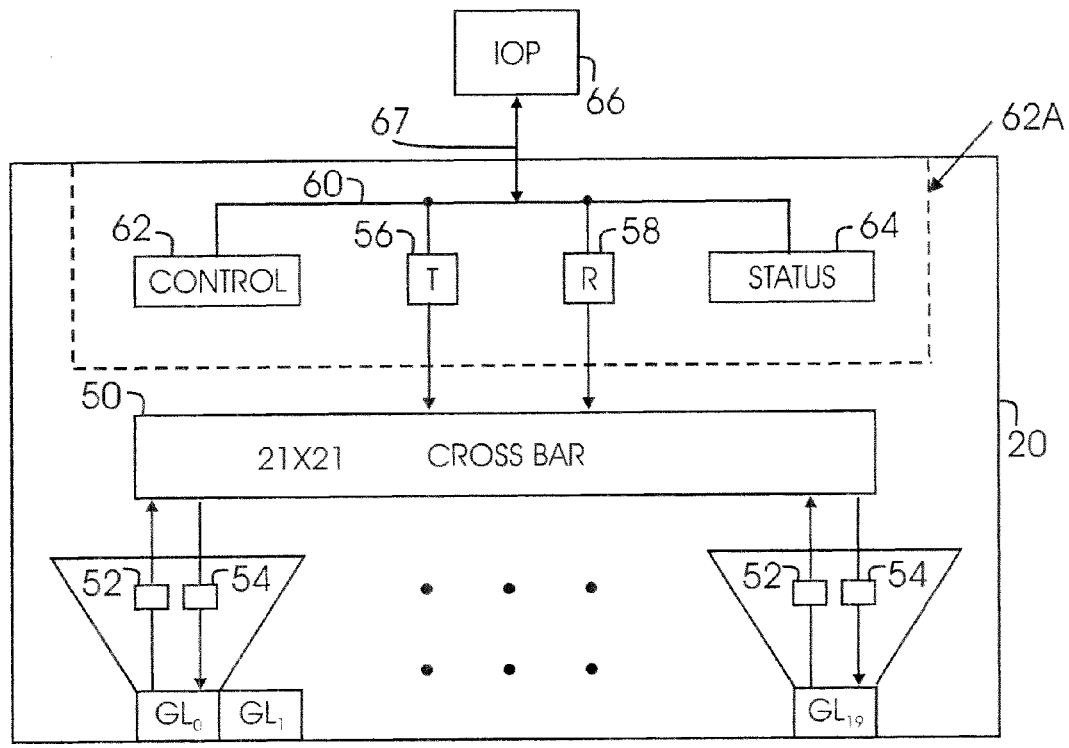
FIG. 1B shows an example of a Fibre Channel switch element, according to one aspect of the present invention.

FIG. 1B is a block diagram of a 20-port ASIC fabric element according to one aspect of the present invention. FIG. 1B provides the general architecture of a 20-channel switch chassis using the 23-port fabric element. Fabric element includes ASIC 20 with non-blocking fibre channel class 2 (connectionless, acknowledged) and class 3 (connectionless, unacknowledged) service between any ports. It is noteworthy that ASIC 20 may also be designed for class 1 (connection-oriented) service, within the scope and operation of the present invention as described herein.

The fabric element of the present invention is presently implemented as a single CMOS ASIC, and for this reason the term "fabric element" and ASIC are used interchangeably to refer to the preferred embodiments in this specification. Although FIG. 1B shows 20 ports, the present invention is not limited to any particular number of ports.

ASIC 20 has 20 ports numbered in FIG. 1B as GL0 through GL19. These ports are generic to common Fibre Channel port types, for example, F_Port, FL_Port and E_Port. In other words, depending upon what it is attached to, each GL port can function as any type of port. Also, the GL port may function as a special port useful in fabric element linking, as described below.

For illustration purposes only, all GL ports are drawn on the same side of ASIC 20 in FIG. 1B. However, the ports may be located on both sides of ASIC 20 as shown in other figures. This does not imply any difference in port or ASIC design. Actual physical layout of the ports will depend on the physical layout of the ASIC.

Each port GL0-GL19 has transmit and receive connections to switch crossbar 50. One connection is through receive buffer 52, which functions to receive and temporarily hold a frame during a routing operation. The other connection is through a transmit buffer 54.

Switch crossbar 50 includes a number of switch crossbars for handling specific types of data and data flow control information. For illustration purposes only, switch crossbar 50 is shown as a single crossbar. Switch crossbar 50 is a connectionless crossbar (packet switch) of known conventional design, sized to connect 21×21 paths. This is to accommodate 20 GL ports plus a port for connection to a fabric controller, which may be external to ASIC 20.

Figure 1C:
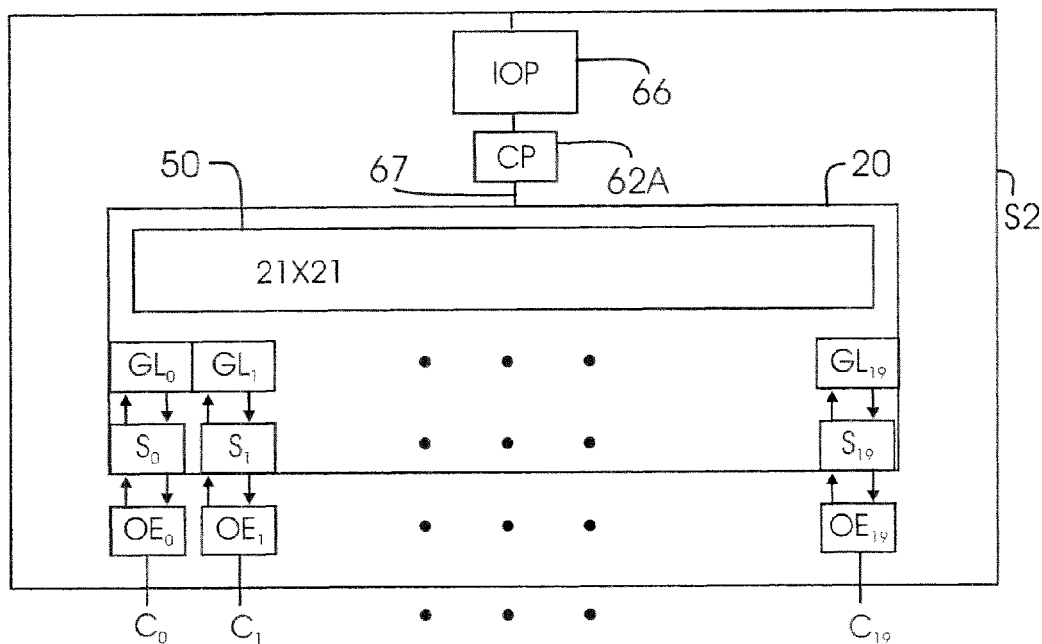
FIG. 1C shows a block diagram of a 20-channel switch chassis, according to one aspect of the present invention.

In the preferred embodiments of switch chassis described herein, the fabric controller is a firmware-programmed microprocessor, also referred to as the input/out processor ("IOP") TOP 66 is shown in FIG. 1C as a part of a switch chassis utilizing one or more of ASIC 20. As seen in FIG. 1B, bi-directional connection to IOP 66 is routed through port 67, which connects internally to a control bus 60. Transmit buffer 56, receive buffer 58, control register 62 and Status register 64 connect to bus 60. Transmit buffer 56 and receive buffer 58 connect the internal connectionless switch crossbar 50 to IOP 66 so that it can source or sink frames.

Control register 62 receives and holds control information from IOP 66, so that IOP 66 can change characteristics or operating configuration of ASIC 20 by placing certain control words in register 62. IOP 66 can read status of ASIC 20 by monitoring various codes that are placed in status register 64 by monitoring circuits (not shown).

FIG. 1C shows a 20-channel switch chassis S2 using ASIC 20 and IOP 66 S2 will also include other elements, for example, a power supply (not shown). The 20 GL ports correspond to channel C0-C19. Each GL port has a serial/deserializer (SERDES) designated as S0-S19. Ideally, the SERDES functions are implemented on ASIC 20 for efficiency, but may alternatively be external to each GL port.

Each GL port has an optical-electric converter, designated as OE0-OE19 connected with its SERDES through serial lines, for providing fibre optic input/output connections, as is well known in the high performance switch design. The converters connect to switch channels C0-C09. It is noteworthy that the ports can connect through copper paths or other means instead of optical-electric converters.

Figure 1D:
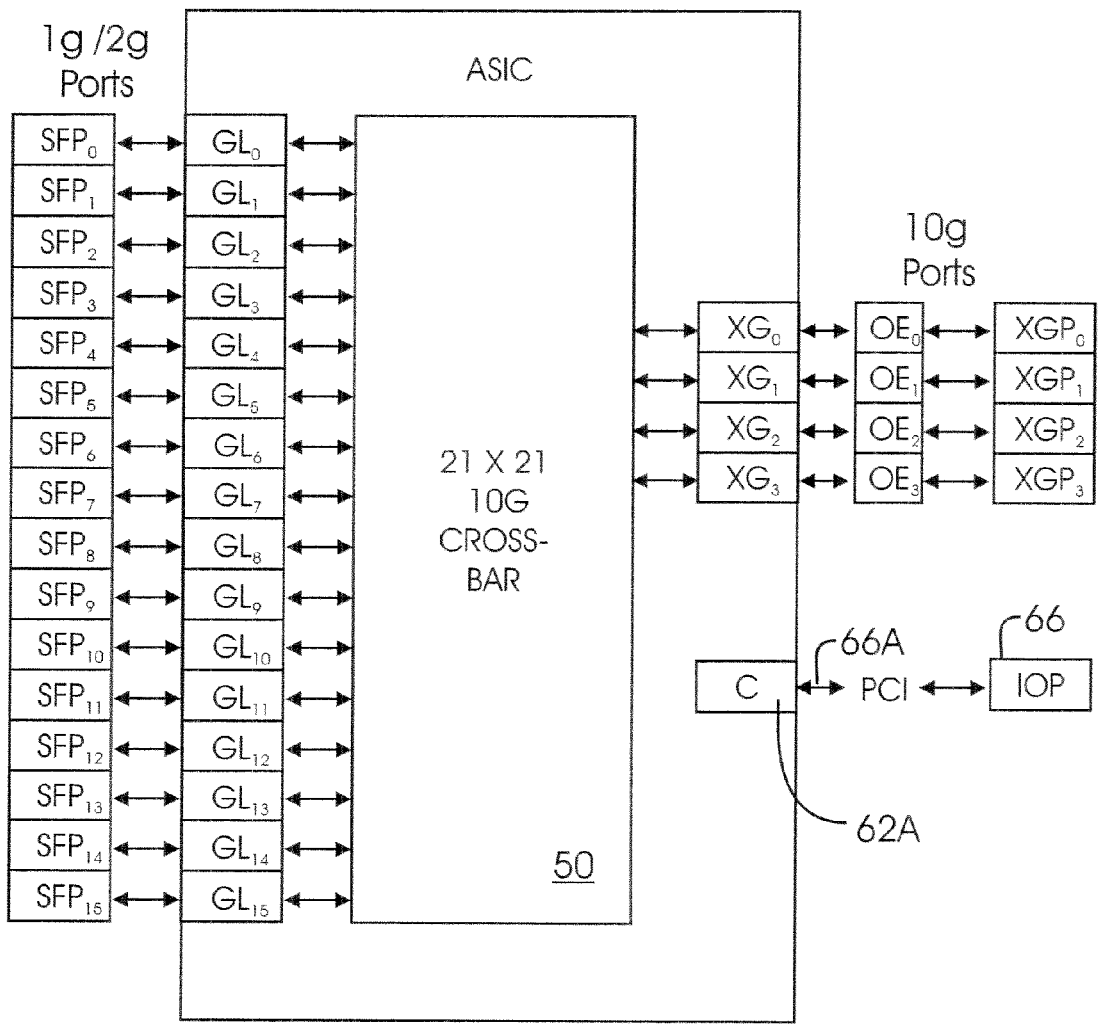
FIG. 1D shows a block diagram of a Fibre Channel switch element with sixteen GL_Ports and four 10G ports, according to one aspect of the present invention.

FIG. 1D shows a block diagram of ASIC 20 with sixteen GL ports and four 10G (Gigabyte) port control modules designated as XG0-XG3 for four 10G ports designated as XGP0-XGP3. ASIC 20 include a control port 62A that is coupled to IOP 66 through a PCI connection 66A.

Figures 1, 1E:
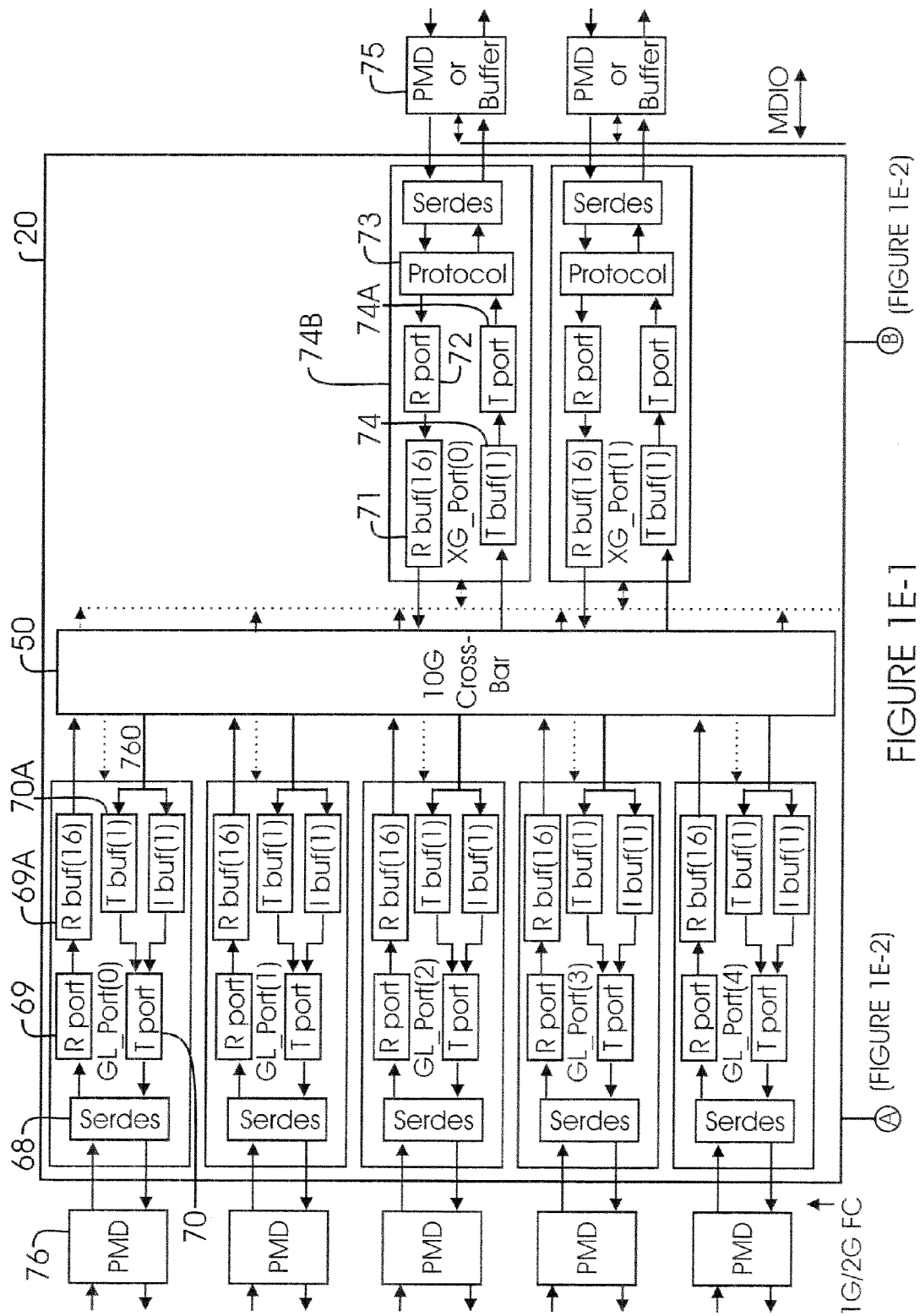
FIGS. 1E-1E-2 (jointly referred to as FIG. 1E) show another block diagram of a Fibre Channel switch element with sixteen GL_Ports and four 10G ports, according to one aspect of the present invention.
Figures 1, 1E, 2:
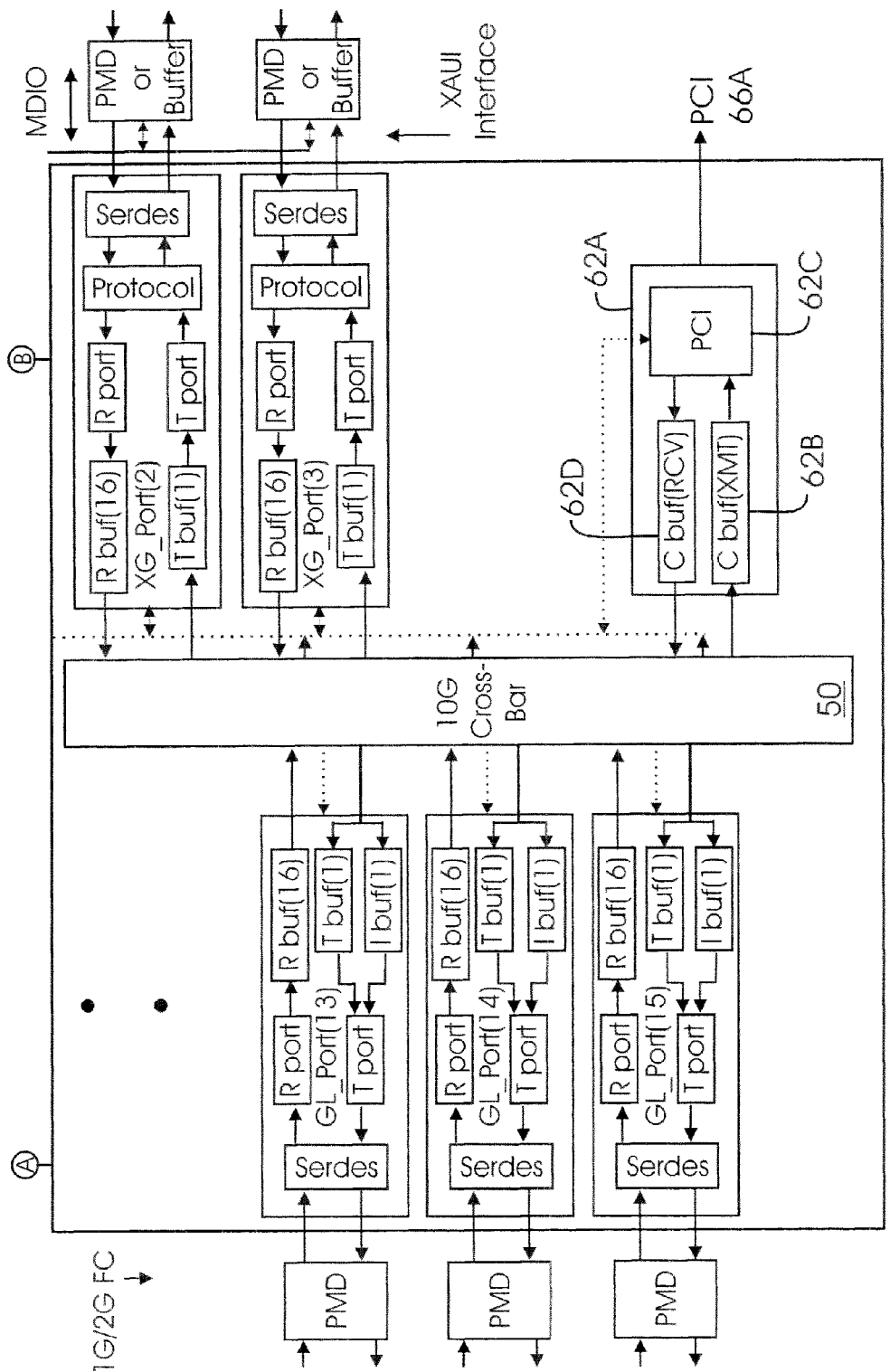

FIG. 1E-1/1E-2 (jointly referred to as FIG. 1E) show yet another block diagram of ASIC 20 with sixteen GL and four XG port control modules. Each GL port control module has a Receive port (RPORT) 69 with a receive buffer (RBUF) 69A and a transmit port 70 with a transmit buffer (TBUF) 70A, as described below in detail. CL and XG port control modules are coupled to physical media devices ("PMD") 76 and 75 respectively.

Control port module 62A includes control buffers 62B and 62D for transmit and receive sides, respectively. Module 62A also includes a PCI interface module 62C that allows interface with IOP 66 via a PCI bus 66A.

XG_Port (for example 74B) includes RPORT 72 with RBUF 71 similar to SPORT 69 and RBUF 69A and a TBUF and TPORT similar to TBUF 70A and TPORT 70. Protocol module 73 interfaces with SERDES to handle protocol based functionality.

Figure 3A:
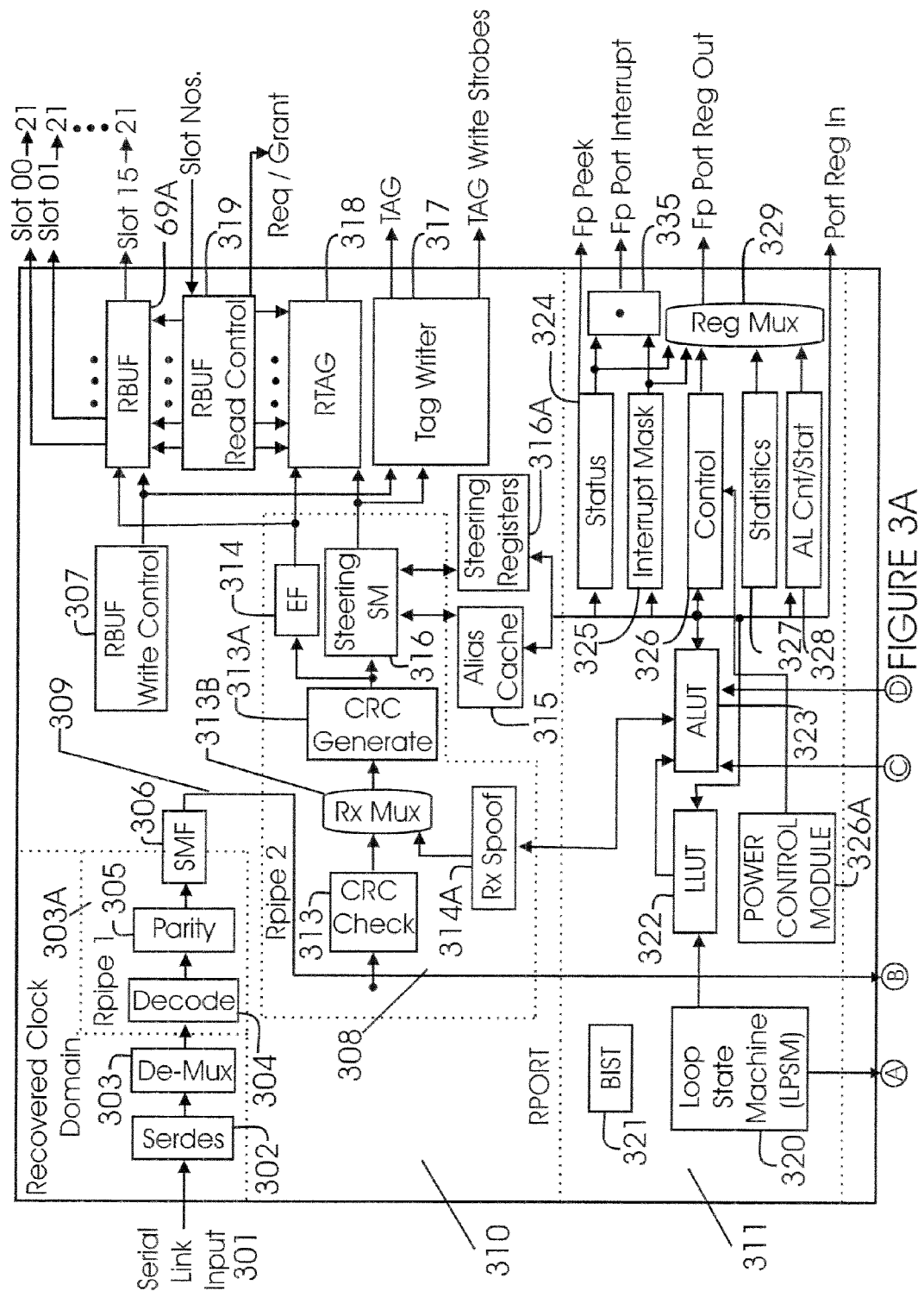
FIG. 3A/3B (jointly referred to as FIG. 3) show a block diagram of a GL_Port, according to one aspect of the present invention.
Figure 3B:
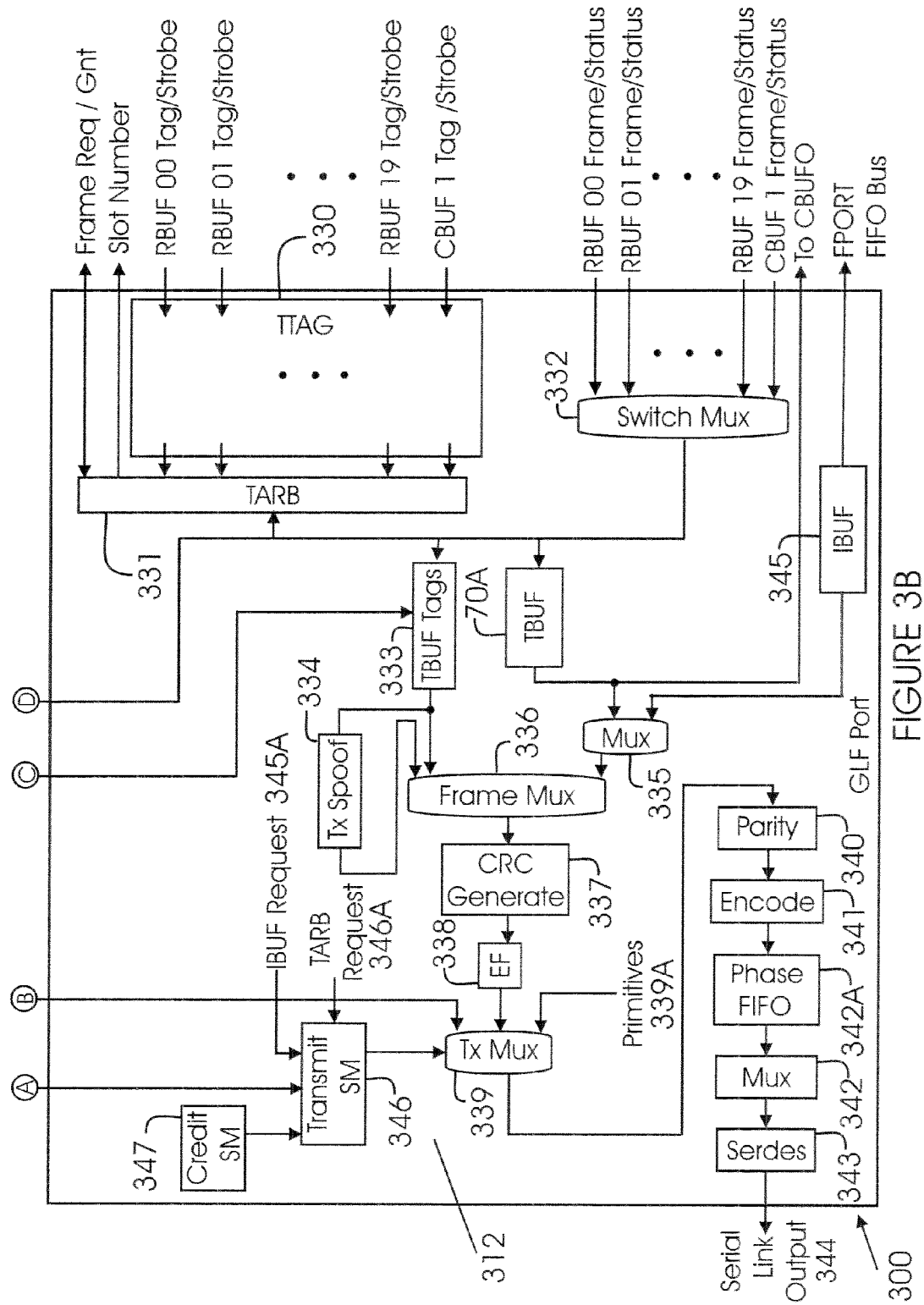

GL Port:

FIGS. 3A-3B (referred to as FIG. 3 show a detailed block diagram of a CL port as used in ASIC 20. GL port 300 is shown in three segments, namely, receive segment (RPORT) 310, transmit segment (TPORT) 312 and common segment 311.

Receive Segment of GL Port:

Frames enter through link 301 and SERDES 302 converts data into 10-bit parallel data to fibre channel characters, which are then sent to receive pipe ("Rpipe" may also be referenced as Rpipe 1 or Rpipe 2) 303A via a de-multiplexer (DEMUX) 303. Rpipe 303A includes, parity module 305 and decoder 304. Decoder 304 decodes 10 B data to 8 B and parity module 305 adds a parity bit. Rpipe 303A also performs various Fibre Channel standard functions such as detecting a start of frame (SOF), end-of frame (EOF), Idles, R_RDYs (fibre channel standard primitive) and the like, which are not described since they are standard functions.

Rpipe 303A connects to smoothing FIFO (SMF) module 306 that performs smoothing functions to accommodate clock frequency variations between remote transmitting and local receiving devices.

Frames received by RPORT 310 are stored in receive buffer (RBUF) 69A, (except for certain Fibre Channel Arbitrated Loop (AL) frames). Path 309 shows the frame entry path, and all frames entering path 309 are written to RBUF 69A as opposed to the AL path 308.

Cyclic redundancy code (CRC) module 313 further processes frames that enter GL port 300 by checking CRC and processing errors according to FC_PH rules. The frames are subsequently passed to RBUF 69A where they are steered to an appropriate output link. RBUF 69A is a link receive buffer and can hold multiple frames.

Reading from and writing to RBUF 69A are controlled by RBUF read control logic ("RRD") 319 and RBUF write control logic ("RWT", 307, respectively. RWT 307 specifies which empty RBUF 69A slot will be written into when a frame arrives through the data link via multiplexer ("Mux") 313B, CRC generate module 313A and in EF (external proprietary format) module 314. EF module 314 encodes proprietary (i.e. non-standard) format frames to standard Fibre Channel 8B codes. Mux 313B receives input from Rx Spoof module 314A, which encodes frames to a proprietary format (if enabled). RWT 307 controls RBUF 69A write addresses and provides the slot number to tag writer ("TWT") 317.

RRD 319 processes frame transfer requests from RBUF 69A. Frames may be read out in any order and multiple destinations may get copies of the frames.

Steering state machine (SSM) 316 receives frames and determines the destination for forwarding the frame. SSM 316 produces a destination mask, where there is one bit for each destination. Any bit set to a certain value, for example, 1, specifies a legal destination, and there can be multiple bits set, if there are multiple destinations for the same frame (multicast or broadcast).

SSM 316 makes this determination using information from alias cache 315, steering registers 316A, control register 326 values and frame contents. IOP 66 writes all tables so that correct exit path is selected for the intended destination port addresses.

The destination mask from SSM 316 is sent to TWT 317 and a RBUF tag register (RTAG) 318. TWT 317 writes tags to all destinations specified in the destination mask from SSM 316. Each tag identifies its corresponding frame by containing an RBUF 69A slot number where the frame resides, and an indication that the tag is valid.

Each slot in RBUF 69A has an associated set of tags, which are used to control the availability of the slot. The primary tags are a copy of the destination mask generated by SSM 316. As each destination receives a copy of the frame, the destination mask in RTAG 318 is cleared. When all the mask bits are cleared, it indicates that all destinations have received a copy of the frame and that the corresponding frame slot in RBUF 69A is empty and available for a new frame.

RTAG 318 also has frame content information that is passed to a requesting destination to precondition the destination for the frame transfer. These tags are transferred to the destination via a read multiplexer (RMUX) (not shown).

Transmit Segment of GL Port:

Transmit segment ("TPORT") 312 performs various transmit functions. Transmit tag register (TTAG) 33Q provides a list of all frames that are to be transmitted. Tag Writer 317 or common segment 311 write TTAG 330 information. The frames are provided to arbitration module ("transmit arbiter" ("TARB")) 331, which is then free to choose which source to process and which frame from that source to be processed next.

TTAG 330 includes a collection of buffers (for example, buffers based on a first-in first out ("FIFO") scheme) for each frame source. TTAG 330 writes a tag for a source and TARB 331 then reads the tag. For any given source, there are as many entries in TTAG 330 as there are credits in RBUF 69A.

TARB 331 is activated anytime there are one or more valid frame tags in TTAG 330. TAR; 331 preconditions its controls for a frame and then waits for the frame to be written into TBUF 70A. After the transfer is complete, TARB 331 may request another frame from the same source or choose to service another source.

TBUF 70A is the path to the link transmitter. Typically, frames don't land in TBUF 70A in their entirety. Mostly, frames simply pass through TBUF 70A to reach output pins, if there is a clear path.

Switch Mux 332 is also provided to receive output from crossbar 50. Switch Mux 332 receives input from plural RBUFs (shown as RBUF 00 to RBUF 19), and input from CPORT 62A shown as CBUF 1 frame/status. TARB 331 determines the frame source that is selected and the selected source provides the appropriate slot number. The output from Switch Mux 332 is sent to ALUT 323 for S_ID spoofing and the result is fed into TBUF Tags 333.

TMUX (may also be referred to as Tx Mux) 339 chooses which data path to connect to the transmitter. The sources are: primitive sequences specified by IOP 66 via control registers 326 (shown as primitive 339A), and signals as specified by Transmit state machine ("TSM") 346, frames following the loop path, or steered frames exiting the fabric via TBUF 70A.

TSM 346 chooses the data to be sent to the link transmitter, and enforces all fibre Channel rules for transmission. TSM 346 receives requests to transmit from loop state machine 320, TBUF 70A (shown as TARB request 346A) and from various other IOP 66 functions via control registers 326 (shown as IBUF Request 345A). TSM 346 also handles all credit management functions, so that Fibre Channel connectionless frames are transmitted only when there is link credit to do so.

Loop state machine ("LPSM") 320 controls transmit and receive functions when GL_Port is in a loop mode. LPSM 320 operates to support loop functions as specified by FC-AL-2.

IOP buffer ("IBUF") 345 provides TOP 66 the means for transmitting frames for special purposes.

Frame multiplexer ("Frame Mux" or "Mux") 336 chooses the frame source, while logic (TX spoof 334) converts D_ID and S_ID from public to private addresses. Mux 336 receives input from Tx Spoof module 334, TBUF tags 333, and Mux 335 to select a frame source for transmission.

EF (external proprietary format) module 338 encodes proprietary (i.e. non-standard) format frames to standard Fibre Channel 8B codes and CRC module 337 generates CRC data for the outgoing frames.

Modules 340-343 put a selected transmission source into proper format for transmission on an output link 344. Parity 340 checks for parity errors, when frames are encoded from 8B to 10B by encoder 341, marking frames "invalid", according to Fibre Channel rules, if there was a parity error. Phase FIFO 342A receives frames from encode module 341 and the frame is selected by Mux 342 and passed to SERDES 343. SERDES 343 converts parallel transmission data to serial before passing the data to the link media. SERDES 343 may be internal or external to ASIC 20.

Common Segment of GL Port:

As discussed above, ASIC 20 include common segment 311 comprising of various modules. LPSM 320 has been described above and controls the general behavior of TPORT 312 and RPORT 310.

A loop look up table ("LLUT") 322 and an address look up table ("ALUT") 323 is used for private loop proxy addressing and hard zoning managed by firmware.

Common segment 311 also includes control register 326 that controls bits associated with a GL_Port, status register 324 that contains status bits that can be used to trigger interrupts, and interrupt mask register 325 that contains masks to determine the status bits that will generate an interrupt to IOP 66. Common segment 311 also includes AL control and status register 328 and statistics register 327 that provide accounting information for FC management information base ("MIB").

Output from status register 324 may be used to generate a Fp Peek function. This allows a status register 324 bit to be viewed and sent to the CPORT.

Output from control register 326, statistics register 327 and register 328 (as well as 328A for an X_Port, shown in FIG. 4) is sent to Mux 329 that generates an output signal (FP Port Reg Out).

Output from Interrupt register 325 and status register 324 is sent to logic 335 to generate a port interrupt signal (FP Port Interrupt).

BIST module 321 is used for conducting embedded memory testing.

CPORT 311 also includes a power control module 326A that minimizes power consumption for systems that do not need all the ports, allowing ASIC 20 to be used in varying platforms. A detailed description of power control module 326A is provided below with respect to FIGS. 2A and 2B.

XG Port

Figure 4A:
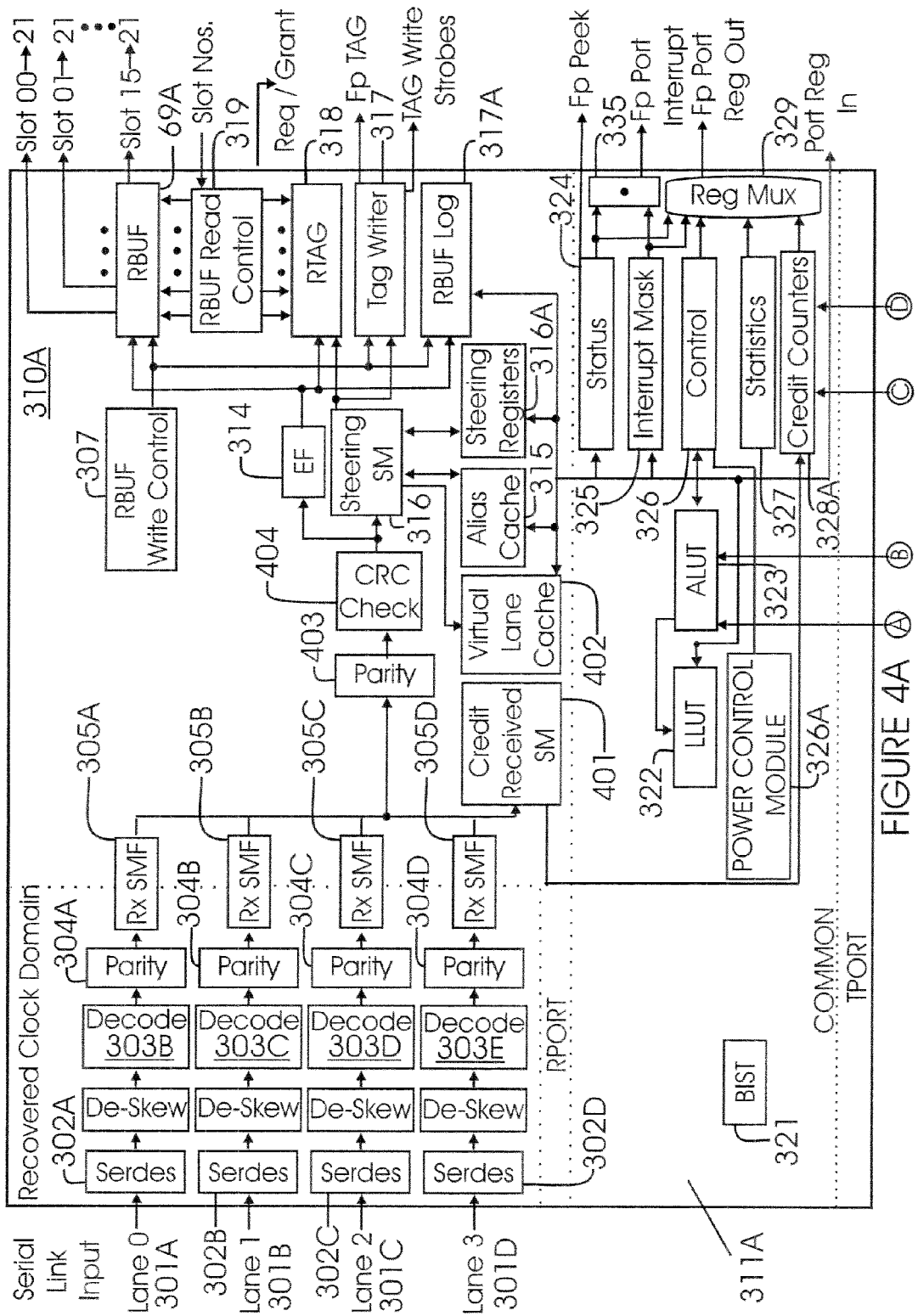
FIG. 4A/4B (jointly referred to as FIG. 3) show a block diagram of XG_Port (10G) port, according to one aspect of the present invention.
Figure 4B:
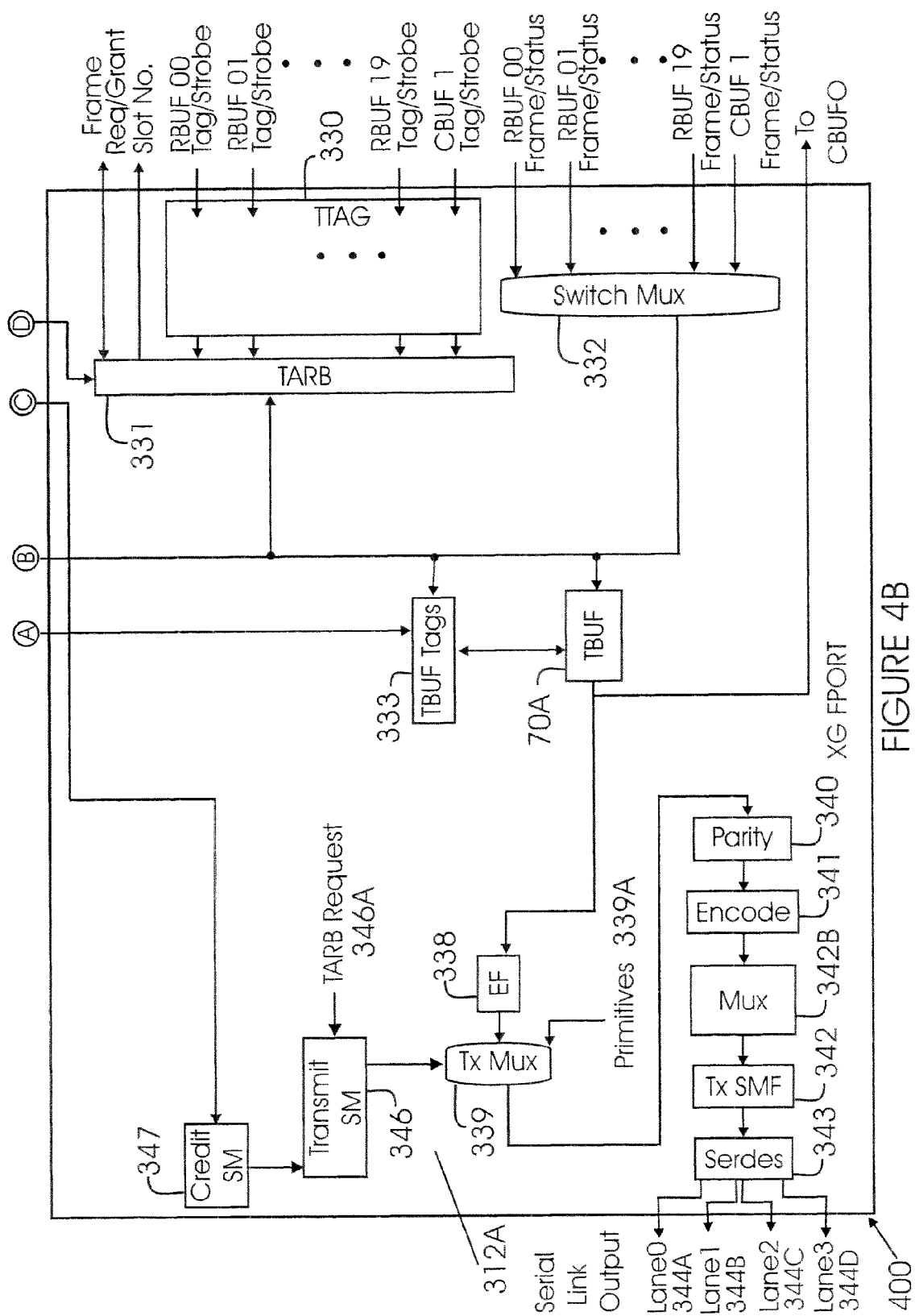

FIGS. 4A-4B (referred to as FIG. 4) show a block diagram of a 10G Fibre Channel port control module (XG FPORT) 400 used in ASIC 20. Various components of XG FPORT 400 are similar to GL port control module 300 that are described above. For example, RPORT 310 and 310A, Common Port 311 and 311A, and TPORT 312 and 312A have common modules as shown in FIGS. 3 and 4 with similar functionality.

RPORT 310A can receive frames from links (or lanes) 301A-301D and transmit frames to lanes 344A-344D. Each link has a SERDES (302A-302D), a de-skew module, a decode module (303B-303E) and parity module (304A-304D). Each lane also has a smoothing FIFO (Tx SMF) module 305A-305D that performs smoothing functions to accommodate clock frequency variations. Parity errors are checked by module 403, while CRC errors are checked by module 404.

RPORT 310A uses a virtual lane ("VL") cache 402 that stores plural vector values that are used for virtual lane assignment. In one aspect of the present invention, VL Cache 402 may have 32 entries and two vectors per entry. IOP 66 is able to read or write VL cache 402 entries during frame traffic State machine 401 controls credit that is received. On the transmit side, credit state machine 347 controls frame transmission based on credit availability. State machine 347 interfaces with credit counters 328A.

Also on the transmit side, modules 340-343 are used for each lane 344A-344D, i.e., each lane can have its own module 340-343. Parity module 340 checks for parity errors and encode module 341 encodes 8-bit data to 10 bit data. Mux 342B sends the 10-bit data to a SMF module 342 that handles clock variation on the transmit side. SERDES 343 then sends the data out to the link.

Figure 2A:
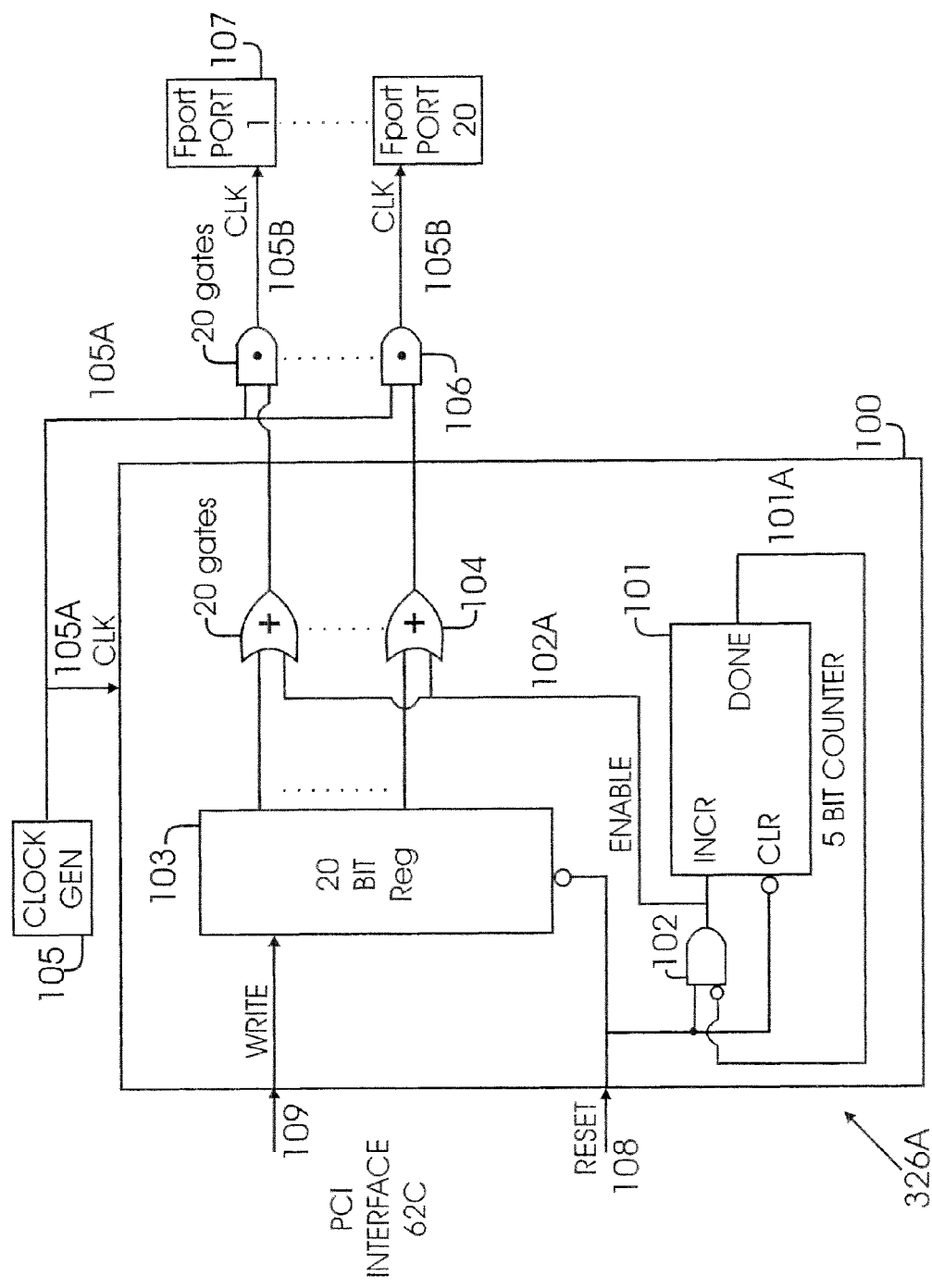
FIG. 2A shows a detailed schematic of a power control module, according to one aspect of the present invention.

Efficient Power Control:

FIG. 2A shows a detailed schematic of power control module 326A that includes log 100 for controlling power consumption of every link port, according to one aspect of the present invention. The schematic allows ASIC 20 to minimize its power consumption for systems that do not need all the ports (for example, all 20 ports). It is noteworthy that the logic used in 326A, as shown In FIG. 2A, is not intended to limit the invention, but rather to illustrate the adaptive aspect of the present invention.

During initial ASIC 20 power on, external reset signal 108 resets PCI bus 66A, logic 100 (which includes a control register 103) and fibre channel ports 107 (in this example, 20 ports). Clock generator 105 generates clock signal 105A that is sent immediately to logic 100. Signal(s) 105A to ports 107 are gated off by gates 106 (there is one gate for each port).

When the reset signal 108 is deactivated, logic 102 enables clock gates 106 (one clock gate for each port) using signal 105B so that ports 107 can have their resets active and are turned on for a short duration. This initial "turn on" of all the ports 107, resets ports 107 to a known state.

At this instance, counter 101 starts counting to its' maximum count. In one aspect, counter 101 is a 5 bit counter. It is noteworthy that the invention is not limited to any particular counter. Thereafter, signal 101A (the "done" signal) is activated and counter 101 stops counting. Done signal 101A removes the enable signal 102A for all ports 107 (via logic 104). This turns off all the clock signals to ports 107.

Thereafter, firmware can write to control register 103 to selectively turn on the active ports from among available ports 107. In this case gate clock signals via gates 106 are turned on only for the active ports.

Figure 2B:
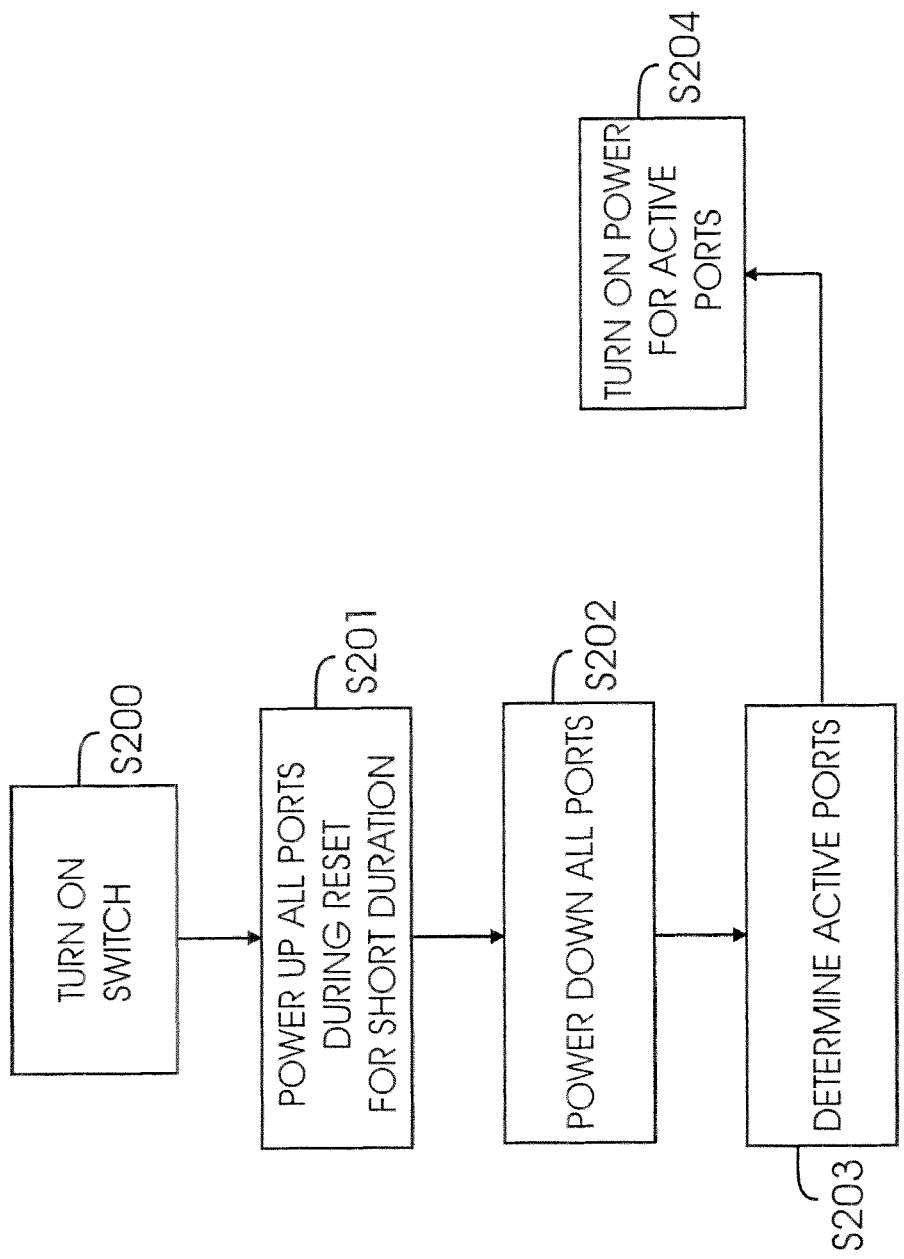
FIG. 2B shows a flow diagram of executable process steps for minimizing the maximum power consumption, according to one aspect of the present invention.

FIG. 2B shows a flow diagram of executable process steps, according to one aspect of the present invention for minimizing the maximum power consumption In step S200, ASIC 20 in a fibre channel switch is turned on.

In step S201, all the ports are powered up. This is done so that when the ports are shut down in a known state.

In step S202, all the ports are powered down, except CPORT 62A.

In step S203, firmware determines the active ports from among available ports 107. The printed circuit board configuration may be used to determine the active ports.

In step S204, only the active ports are powered up. This is achieved by using control register 103 as discussed above.

In one aspect of the present invention, ASIC 20 can be used in systems that require and use fewer ports. Smaller systems will use less power and hence reduce overall cost and cooling requirements. Table I below shows an example of power savings using the foregoing adaptive aspects of the present invention:

| NO. OF 1 OR 2 GIG PORTS | NO. OF 10 GIG PORTS | POWER REQUIREMENTS |
| --- | --- | --- |
| 16 | 4 | 15 WATTS |
| 16 | 0 | 9 WATTS |
| 8 | 1 | 7 WATTS |
| 8 | 0 | 6 WATTS |

In one aspect of the present invention, worst-case power requirements are reduced. Also, different size systems can be designed with the same switch element and optimize cooling and power requirements for reduced space and cost.

Although the present invention has been described with reference to specific embodiments, these embodiments are illustrative only and not limiting. Many other applications and embodiments of the present invention will be apparent in light of this disclosure and the following claims.

What is claimed is:

1. A method for controlling power consumption in a switch element having a plurality of ports for transmitting and receiving network information, comprising:

(a) powering up the plurality of ports for a duration during the switch element initialization so that if the plurality of ports are shut down, they are shut down in a known state;
  (b) shutting down all the ports in the known state, except a control port of the switch element;
  (c) determining active ports of the switch element, after all the ports are shut down in the known state; and
  (d) providing power to only the active ports to receive and transmit network information.

2. The method of claim 1, wherein the plurality of ports are powered up during a reset operation.

3. The method of claim 1, wherein firmware for the switch element determines the active ports.

4. The method of claim 3, wherein the firmware writes to a control register in a power control module to selectively turn on power to the active ports.

5. The method of claim 1, wherein a counter counts the duration for which the plurality of ports are powered up and when the counter reaches a certain value, clock signals to the plurality of ports are turned off to shut down all the ports, except the control port.

6. A switch element, comprising:

a plurality of ports for receiving and sending network information over a network; and
  a power control module for controlling power consumption by the plurality of ports; wherein the power control module includes:

(a) a counter that starts a count when the plurality of ports are all powered up for a duration during a reset operation, causing the plurality of ports to be in a known state;
  (b) logic for turning off power to the plurality of ports except a control port, after the counter reaches a maximum value; wherein the plurality of ports are shut down in a known state; and
  (c) a control register which is written by firmware of the switch element to provide power only to active ports, after the plurality of ports are shut down.

7. The switch element of claim 6, wherein a clock generator generates a clock signal for powering up during the reset operation.

8. The switch element of claim 6, wherein the clock signal is turned off after the counter reaches the maximum value and then turned on when the firmware writes to the control register.

9. A system, comprising:

a switch element coupled to at least another network device; wherein the switch elements includes:
  a plurality of ports for receiving and sending network information over a network; and
  a power control module for controlling power consumption by the plurality of ports; wherein the power control module includes:

(a) a counter that starts a count when the plurality of ports are powered up for a duration during a reset operation, which causes the plurality of ports to be in a known state;
  (b) logic for turning off power to the plurality of ports except a control port, after the counter reaches a maximum value; wherein the plurality of ports are shut down in a known state; and
  (c) a control register which is written by firmware of the switch element to provide power only to active ports, after the plurality of ports are shut down.

10. The system of claim 9, wherein a clock generator generates a clock signal for powering up the plurality of ports during the reset operation.

11. The system of claim 10, wherein the clock signal is turned off after the counter reaches the maximum value and then turned on when the firmware writes to the control register.

* * * * *

UNITED STATES PATENT AND TRADEMARK OFFICE
CERTIFICATE OF CORRECTION

| | | |
|---|---|---|
| PATENT NO. | : 7,822,061 B2 | Page 1 of 2 |
| APPLICATION NO. | : 12/267188 | |
| DATED | : October 26, 2010 | |
| INVENTOR(S) | : Frank R. Dropps et al. | |

It is certified that error appears in the above-identified patent and that said Letters Patent is hereby corrected as shown below:

On the Title Pg, Item (57), under "Abstract", line 2, delete "fiber" and insert -- fibre --, therefor.

On the Title Pg, Item (57), under "Abstract", line 5, delete "fiber" and insert -- fibre --, therefor.

On the Title Pg, Item (57), under "Abstract", line 7, delete "fiber" and insert -- fibre --, therefor.

On the Title Pg, Item (57), under "Abstract", line 10, delete "fiber" and insert -- fibre --, therefor.

On the Title Pg, page 2, Item (56) under "Other Publications", line 13, delete "0,50"," and insert -- 0.5", --, therefor.

In column 3, line 37, delete "inventions" and insert -- invention, --, therefor.

In column 3, line 64, delete "1E-1E-2" and insert -- 1E-1/E-2 --, therefor.

In column 4, line 32, delete "IF," and insert -- IP, --, therefor.

In column 5, line 25, delete "23-port" and insert -- 20-port --, therefor.

In column 5, line 67, delete ""IOP") TOP" and insert -- ("IOP"). IOP --, therefor.

In column 6, line 15, delete "66 S2" and insert -- 66. S2 --, therefor.

In column 6, line 17-18, delete "serial/deserlalizer" and insert -- serial/deserializer --, therefor.

In column 6, line 25, delete "C0-C09." and insert -- C0-C19. --, therefor.

In column 6, line 38, delete "CL" and insert -- GL --, therefor.

Signed and Sealed this
Fifteenth Day of February, 2011

David J. Kappos
*Director of the United States Patent and Trademark Office*

CERTIFICATE OF CORRECTION (continued)
U.S. Pat. No. 7,822,061 B2

In column 6, line 46, delete "SPORT" and insert -- RPORT --, therefor.

In column 6, line 51, delete "FIG. 3" and insert -- FIG. 3) --, therefor.

In column 6, line 52, delete "CL" and insert -- GL --, therefor.

In column 6, line 62, delete "10 B" and insert -- 10B --, therefor.

In column 6, line 62, delete "8 B" and insert -- 8B --, therefor.

In column 7, line 18, delete "("RWT"," and insert -- ("RWT") --, therefor.

In column 7, line 59, delete "precondition" and insert -- pre-condition --, therefor.

In column 7, line 64, delete "33Q" and insert -- 330 --, therefor.

In column 8, line 10, delete "TAR;" and insert -- TARB --, therefor.

In column 8, line 46, delete "TOP" and insert -- IOP --, therefor.

In column 9, line 6, delete "("LLUT"" and insert -- ("LLUT") --, therefor.

In column 9, line 56, delete "traffic" and insert -- traffic. --, therefor.

In column 10, line 3, delete "log" and insert -- logic --, therefor.

In column 10, line 8, delete "In" and insert -- in --, therefor.

In column 10, line 35, delete "consumption" and insert -- consumption. --, therefor.

In column 10, line 47, delete "103" and insert -- 103, --, therefor.